(12) United States Patent
Xu et al.

(10) Patent No.: US 11,181,681 B2
(45) Date of Patent: *Nov. 23, 2021

(54) MULTI-WAVEGUIDE OPTICAL STRUCTURE WITH DIFFRACTION GRATING

(71) Applicant: Molecular Imprints, Inc., Austin, TX (US)

(72) Inventors: Frank Y. Xu, Austin, TX (US); Michael Nevin Miller, Austin, TX (US); Kang Luo, Austin, TX (US); Vikramjit Singh, Pflugerville, TX (US); Michael Klug, Austin, TX (US)

(73) Assignee: Molecular Imprints, Inc., Austin, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/599,782

(22) Filed: Oct. 11, 2019

(65) Prior Publication Data

US 2020/0124782 A1    Apr. 23, 2020

Related U.S. Application Data

(63) Continuation of application No. 15/705,838, filed on Sep. 15, 2017, now Pat. No. 10,444,422.

(Continued)

(51) Int. Cl.
*G02B 5/18* (2006.01)
*F21V 8/00* (2006.01)
(Continued)

(52) U.S. Cl.
CPC ......... *G02B 6/0038* (2013.01); *G02B 6/0065* (2013.01); *G02B 6/0076* (2013.01);
(Continued)

(58) Field of Classification Search
CPC ............ G02B 5/18; G02B 2005/1804; G02B 5/1842; G02B 5/1847; G02B 5/1857;
(Continued)

(56) References Cited

U.S. PATENT DOCUMENTS 7,710,650 B2    5/2010 Inoguchi
7,784,954 B1 *  8/2010 Coleman ............... G02B 5/021
                                                    362/19

(Continued)

FOREIGN PATENT DOCUMENTS

JP    2007058945 A    3/2007
JP    2014-132328 A   7/2014
(Continued)

OTHER PUBLICATIONS

Extended European Search Report in Appln. No. 17876076.5, dated Nov. 15, 2019, 8 pages.
(Continued)

*Primary Examiner* — Arnel C Lavarias
(74) *Attorney, Agent, or Firm* — Fish & Richardson P.C.

(57) ABSTRACT

A multi-waveguide optical structure, including multiple waveguides stacked to intercept light passing sequentially through each waveguide, each waveguide associated with a differing color and a differing depth of plane, each waveguide including: a first adhesive layer, a substrate having a first index of refraction, and a patterned layer positioned such that the first adhesive layer is between the patterned layer and the substrate, the first adhesive layer providing adhesion between the patterned layer and the substrate, the patterned layer having a second index of refraction less than the first index of refraction, the patterned layer defining a diffraction grating, wherein a field of view associated with the waveguide is based on the first and the second indices of refraction.

20 Claims, 4 Drawing Sheets

Related U.S. Application Data (60) Provisional application No. 62/428,193, filed on Nov. 30, 2016.

(51) Int. Cl.
  *G02B 27/42* (2006.01)
  *G02B 1/11* (2015.01)

(52) U.S. Cl.
  CPC ............ *G02B 1/11* (2013.01); *G02B 27/4205* (2013.01); *G02B 27/4272* (2013.01)

(58) Field of Classification Search
  CPC .... G02B 5/1866; G02B 5/1871; G02B 27/42; G02B 27/4205; G02B 27/4222; G02B 27/4227; G02B 27/4272; G02B 27/4277; G02B 27/4288; G02B 27/44
  USPC ........ 359/558, 566, 569, 571, 574, 575, 576
  See application file for complete search history.

(56) References Cited

U.S. PATENT DOCUMENTS

| | | | |
|---|---|---|---|
| 8,081,382 | B2 | 12/2011 | Okada et al. |
| 9,557,455 | B2 | 1/2017 | Kurata |
| 10,444,422 | B2 * | 10/2019 | Xu ....................... G02B 6/0065 |
| 2002/0097962 | A1 | 7/2002 | Yoshimura et al. |
| 2003/0174978 | A1 | 9/2003 | Veligdan |
| 2005/0073747 | A1 | 4/2005 | Suzudo |
| 2007/0183047 | A1 | 8/2007 | Phillips et al. |
| 2007/0211994 | A1 | 9/2007 | Desanto et al. |
| 2007/0263285 | A1 | 11/2007 | Walter et al. |
| 2009/0148619 | A1 | 6/2009 | LaBrake et al. |
| 2014/0140653 | A1 | 5/2014 | Brown et al. |
| 2014/0140654 | A1 | 5/2014 | Brown et al. |
| 2014/0311570 | A1 * | 10/2014 | Raymond .............. G02B 5/045 136/259 |
| 2016/0116739 | A1 | 4/2016 | Tekolste et al. |
| 2016/0216416 | A1 | 7/2016 | Tekolste et al. |
| 2016/0266387 | A1 | 9/2016 | Tekolste et al. |
| 2018/0149796 | A1 | 5/2018 | Xu et al. |

FOREIGN PATENT DOCUMENTS

| | | |
|---|---|---|
| JP | 2015-118273 A | 6/2015 |
| JP | 2015-184561 A | 10/2015 |

OTHER PUBLICATIONS

PCT International Search Report and Written Opinion for International Appln. No. PCT/US2017/051796, dated Jan. 8, 2018, 15 pages.

CN Office Action in Chinese Appln. No. 201780073732.5, dated Apr. 26, 2020, 17 pages (with English translation).

JP Office Action in Japanese Appln. No. 2019-528690, dated Feb. 2, 2021, 12 pages (with English translation).

* cited by examiner

MULTI-WAVEGUIDE OPTICAL STRUCTURE WITH DIFFRACTION GRATING

CROSS-REFERENCE TO RELATED APPLICATION

This application is a continuation of U.S. application Ser. No. 15/705,838, filed on Sep. 15, 2017, which claims the benefit of the filing date of U.S. Provisional Application No. 62/428,193, filed on Nov. 30, 2016. The contents of U.S. Application No. 62/428,193 and Ser. No. 15/705,838 are incorporated herein by reference in their entirety.

TECHNICAL FIELD OF THE INVENTION

This invention relates to waveguide displays, and multi-waveguide optical structures.

BACKGROUND OF THE INVENTION

Diffraction gratings are optical components with periodic structures that can split and diffract light into several beams travelling into different directions. The directions of these beams depend on the spacing of the grating and the wavelength of the light. In some examples, a diffraction grating is made up of a set of slots with a spacing wider than the wavelength of the light to cause diffraction. After the light interacts with the grating, the diffracted light is composed of the sum of interfering waves emanating from each slot in the grating. Depths of the slots affect the path length of the waves to each slot, which accordingly affect the phases of the waves from each of the slots and thus the diffractive efficiencies of the slots. If the slots have a uniform depth, the slots in the grating may have a uniform diffractive efficiency. If the slots have non-uniform depths, the slots in the grating may have non-uniform diffractive efficiencies.

SUMMARY OF THE INVENTION

Innovative aspects of the subject matter described in this specification may include a multi-waveguide optical structure, including multiple waveguides stacked to intercept light passing sequentially through each waveguide, each waveguide associated with a differing color and a differing depth of plane, each waveguide including a first adhesive layer, a substrate having a first index of refraction, and a patterned layer positioned such that the first adhesive layer is between the patterned layer and the substrate, the first adhesive layer providing adhesion between the patterned layer and the substrate, the patterned layer having a second index of refraction less than the first index of refraction, the patterned layer defining a diffraction grating, wherein a field of view associated with the waveguide is based on the first and the second indices of refraction.

These and other embodiments may each optionally include one or more of the following features. For instance, each waveguide further comprises a second adhesive layer positioned such that the substrate is between the first adhesive layer and the second adhesive layer. A waveguide support connecting and positioning each of the multiple waveguides, with at least one of the first and second adhesive layers of each waveguide adhering to the waveguide support. Each waveguide further comprises an anti-reflective layer positioned between the substrate and the second adhesive layer. Each waveguide further comprises an additional patterned layer positioned such that the second adhesive layer is positioned between the substrate and the additional patterned layer. The substrate is made of glass or sapphire. The field of view of each waveguide is at least 50 degrees. The second index of refraction is approximately 1.5 and the first index of refraction is at least 1.7. The patterned layer includes a residual layer thickness of less than 50 nanometers.

Innovative aspects of the subject matter described in this specification may include a multi-waveguide optical structure, including multiple waveguides stacked to intercept light passing sequentially through each waveguide, each waveguide associated with a differing color and a differing depth of plane, each waveguide including a first adhesive layer, an anti-reflective layer, a substrate positioned between the first adhesive layer and the anti-reflective layer, the substrate having a first index of refraction, a first patterned layer positioned such that the first adhesive layer is between the first patterned layer and the substrate, the first adhesive layer providing adhesion between the first patterned layer and the substrate, the first patterned layer having a second index of refraction less than the first index of refraction, the first patterned layer defining a diffraction grating, wherein a field of view associated with the waveguide is based on the first and the second indices of refraction, a second adhesive layer, and a second patterned layer positioned such that the second adhesive layer is positioned between the anti-reflective layer and the second patterned layer, the second adhesive layer providing adhesion between the second patterned layer and the anti-reflective layer.

Innovative aspects of the subject matter described in this specification may include multiple waveguides stacked to intercept light passing sequentially through each waveguide, each waveguide associated with a differing color and a differing depth of plane, each waveguide including a first adhesive layer, an anti-reflective layer, a substrate positioned between the first adhesive layer and the anti-reflective layer, the substrate having a first index of refraction, a patterned layer positioned such that the first adhesive layer is between the patterned layer and the substrate, the first adhesive layer providing adhesion between the patterned layer and the substrate, the patterned layer having a second index of refraction less than the first index of refraction, the patterned layer defining a diffraction grating, wherein a field of view associated with the waveguide is based on the first and the second indices of refraction, and a second adhesive layer positioned such that the anti-reflective layer is positioned between the second adhesive layer and the substrate; and a waveguide support connecting and positioning each of the multiple waveguides, with at least one of the first and second adhesive layers of each waveguide adhering to the waveguide support.

Particular implementations of the subject matter described in this specification can be implemented so as to realize one or more of the following advantages. Implementations of the present disclosure may abrogate the need for etching of a glass (or sapphire) substrate to form diffraction gratings. By such abrogation, the present disclosure enables simpler, higher volume processing of highly efficient diffraction waveguide displays that also exhibit enhanced environmental stability and benefits for building multi-waveguide light field displays while lowering manufacturing costs. Furthermore, the present disclosure provides formation of a composite material structure of the waveguide that is both optically efficient and lower cost versus traditional methods of formation.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

This document describes a multi-waveguide optical structure. Specifically, the multi-waveguide optical structure includes multiple waveguides stacked to intercept light passing sequentially through each waveguide. Each waveguide is associated with a differing color and a differing depth of plane. Furthermore, each waveguide is associated with a first adhesive layer, a substrate having a first index of refraction, and a patterned layer positioned such that the first adhesive layer is between the patterned layer and the substrate. The first adhesive layer provides adhesion between the patterned layer and the substrate. The patterned layer has a second index of refraction less than the first index of refraction and defines a diffraction grating. A field of view associated with the waveguide is based on the first and the second indices of refraction.

Figure 1:
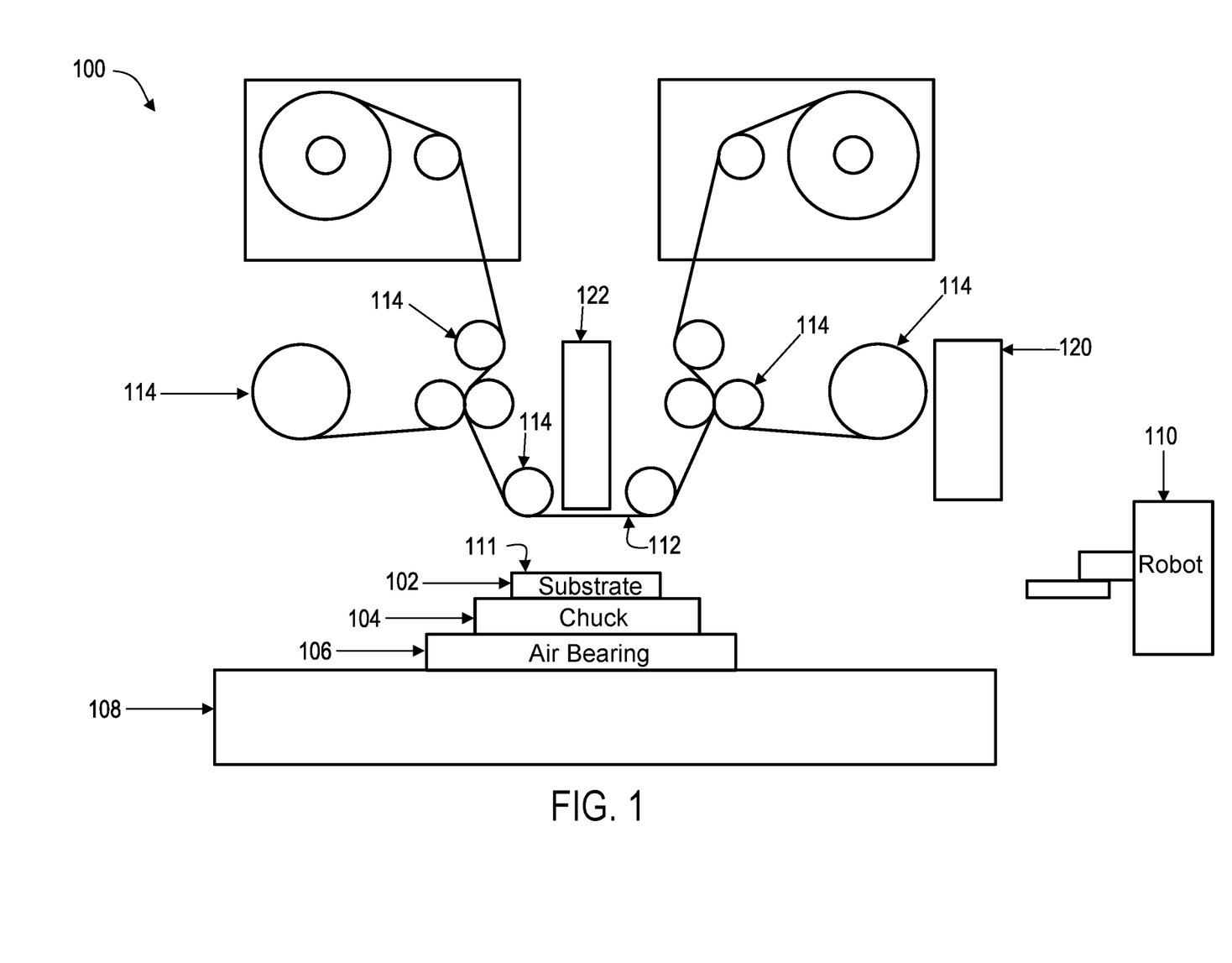
FIG. 1 illustrates a simplified side view of a lithographic system in accordance with embodiments of the present invention.

FIG. 1 illustrates an imprint lithography system 100 that forms a relief pattern on a substrate 102. The substrate 102 may be coupled to a substrate chuck 104. In some examples, the substrate chuck 104 can include a vacuum chuck, a pin-type chuck, a groove-type chuck, an electromagnetic chuck, and/or the like. In some examples, the substrate 102 and the substrate chuck 104 may be further positioned on an air bearing 106. The air bearing 106 provides motion about the x-, y-, and/or z-axes. In some examples, the substrate 102 and the substrate chuck 104 are positioned on a stage. The air bearing 106, the substrate 102, and the substrate chuck 104 may also be positioned on a base 108. In some examples, a robotic system 110 positions the substrate 102 on the substrate chuck 104.

The imprint lithography system 100 further includes an imprint lithography flexible template 112 that is coupled to one or more rollers 114, depending on design considerations. The rollers 114 provide movement of a least a portion of the flexible template 112. Such movement may selectively provide different portions of the flexible template 112 in super-imposition with the substrate 102. In some examples, the flexible template 112 includes a patterning surface that includes a plurality of features, e.g., spaced-apart recesses and protrusions. However, in some examples, other configurations of features are possible. The patterning surface may define any original pattern that forms the basis of a pattern to be formed on substrate 102. In some examples, the flexible template 112 may be coupled to a template chuck, e.g., a vacuum chuck, a pin-type chuck, a groove-type chuck, an electromagnetic chuck, and/or the like.

The imprint lithography system 100 may further comprise a fluid dispense system 120. The fluid dispense system 120 may be used to deposit a polymerizable material on the substrate 102. The polymerizable material may be positioned upon the substrate 102 using techniques such as drop dispense, spin-coating, dip coating, chemical vapor deposition (CVD), physical vapor deposition (PVD), thin film deposition, thick film deposition, and/or the like. In some examples, the polymerizable material is positioned upon the substrate 102 as a plurality of droplets.

Figure 2:
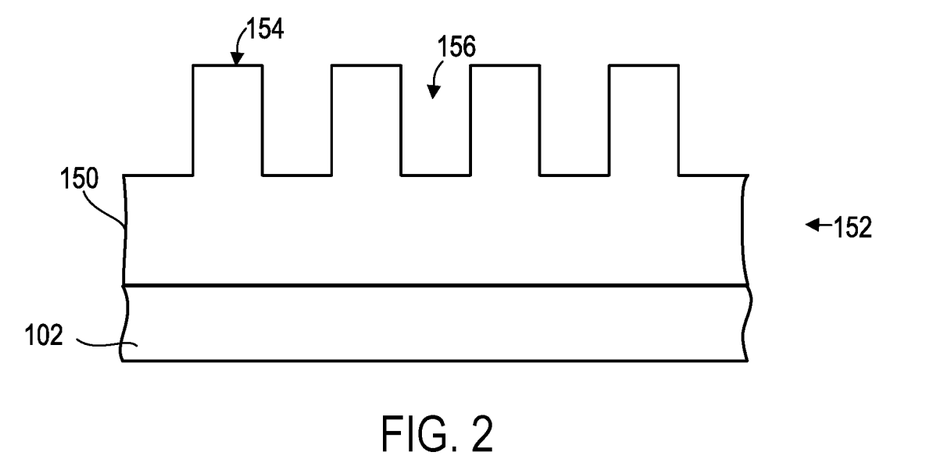
FIG. 2 illustrates a simplified side view of a substrate having a patterned layer positioned thereon.

Referring to FIGS. 1 and 2, the imprint lithography system 100 may further comprise an energy source 122 coupled to direct energy towards the substrate 102. In some examples, the rollers 114 and the air bearing 106 are configured to position a desired portion of the flexible template 112 and the substrate 102 in a desired positioning. The imprint lithography system 100 may be regulated by a processor in communication with the air bearing 106, the rollers 114, the fluid dispense system 120, and/or the energy source 122, and may operate on a computer readable program stored in a memory.

In some examples, the rollers 114, the air bearing 106, or both, vary a distance between the flexible template 112 and the substrate 102 to define a desired volume therebetween that is filled by the polymerizable material. For example, the flexible template 112 contacts the polymerizable material. After the desired volume is filled by the polymerizable material, the energy source 122 produces energy, e.g., broadband ultraviolet radiation, causing the polymerizable material to solidify and/or cross-link conforming to shape of a surface of the substrate 102 and a portion of the patterning surface of the flexible template 122, defining a patterned layer 150 on the substrate 102. In some examples, the patterned layer 150 may comprise a residual layer 152 and a plurality of features shown as protrusions 154 and recessions 156.

Figure 3:
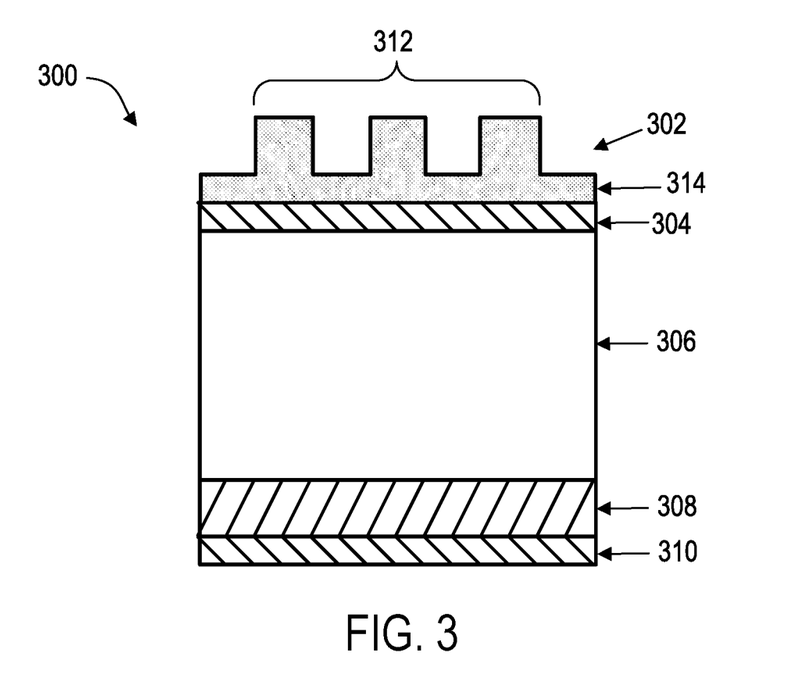
FIGS. 3, 5, and 6 illustrate a waveguide.

FIG. 3 illustrates a waveguide 300 that may be formed utilizing the imprint lithography system 100. In short, the waveguide 300 intercepts light passing therethrough, e.g., from a source of light (light beam), and provides total internal refraction of the light. In some examples, the waveguide 300 facilitates the generation of a virtual content display. The waveguide 300 is a multi-layered structure that includes a patterned layer 302, a first adhesive layer 304, a substrate 306, an anti-reflective layer 308, and a second adhesive layer 310.

The substrate 306 is positioned between the first adhesive layer 304 and the anti-reflective layer 308. The substrate 306 is associated with a first index of refraction, and in some examples, is made of glass or sapphire. In some examples, the first index of refraction is at least 1.7 or greater. The first adhesive layer 304 provides adhesion between the patterned layer 302 and the substrate 306. The first adhesive layer 304 can be made of such materials as acrylated resin.

The patterned layer 302 is positioned such that the first adhesive layer 304 is between the patterned layer 302 and the substrate 306. The patterned layer 302 can include a photo-cured acrylic polymer layer. The patterned layer 302 is associated with a second index of refraction. In some examples, the first index of refraction is greater than the second index of refraction. In some examples, the second index of refraction is approximately 1.5. The patterned layer 302 further includes diffraction gratings 312 and a residual layer 314. In some examples, the residual layer 314 has a thickness less than 100 nanometers, and further, in some examples, less than 50 nanometers. The diffraction gratings 312 can be formed by such methods including imprint lithography, and can include a critical dimension of approximately 100 nanometers.

To that end, as a result of the waveguide 300 including the residual layer 314 positioned between the substrate 306 and the diffraction gratings 312, the waveguide 300 can define a diffraction-based waveguide display. In particular, the combination of the patterned layer 302 and the substrate 306, and specifically, the combination of the patterned layer 302 associated with the second index of refraction (e.g., approximately 1.5) and the substrate 306 associated with the first index of refraction (e.g., greater than 1.7) provides the diffraction-based waveguide display. Moreover, the diffraction-based waveguide display is provided without forming diffraction gratings in the substrate 306 as a result of forming the diffraction-based waveguide display based on the combination of the patterned layer 302 associated with the second index of refraction (e.g., approximately 1.5) and the substrate 306 associated with the first index of refraction (e.g., greater than 1.7). Thus, the need to dry etch the substrate 306 (e.g., dry etch high-index glass or sapphire) is abrogated. However, in some examples, the substrate 306 can be partially etched (e.g., a plasma process under atmospheric or low pressure conditions) to remove the residual layer 314 and/or transfer the pattern into the substrate 306, while maintaining a portion of the residual layer 314 on a surface of the substrate 306.

In some examples, as a result of the residual layer 314 having a thickness less than 100 nanometers, or less than 50 nanometers, refractive index matching between the patterned layer 302 and the substrate 306 is reduced, or minimized.

The waveguide 300 is associated with a field of view based on the first and the second indices of refraction. That is, the field of view of the waveguide 300 is based on the combination of the second index of refraction associated with the patterned layer 302 and the first index of refraction associated with the substrate 306. In some examples, the field of view of the waveguide 300 is at least 50 degrees. That is, when the second index of refraction associated with the patterned layer 302 is approximately 1.5, and the first index of refraction associated with the substrate 306 is greater than 1.7, the field of view associated with the waveguide 300 is at least 50 degrees.

The anti-reflective layer 308 is positioned between the substrate 306 and the second adhesive layer 310. In some examples, the anti-reflective layer 308 is inorganic. The anti-reflective layer 308 and/or the patterned layer 302 provide environment protection/stability to the substrate 306. Specifically, when the substrate 306 includes glass (or sapphire) with a high-index (e.g., greater than 1.7), the substrate 306, when exposed to the environment, can form precipitants at a surface of the substrate 306. As a result, a haze contamination layer can form, (e.g., on the surface of the substrate 306), corrosion of the substrate 302 can form, and/or scattered light associated with the waveguide 300 can increase. To that end, the anti-reflective layer 308 and/or the patterned layer 302 isolate the ionic surface of the substrate 306 (e.g., ionic surface of glass substrate), providing the environmental protection/stability of the substrate 306.

The second adhesion layer 310 provides adhesion between the anti-reflective layer 308 and the substrate 306. In some examples, the second adhesion layer 310 is vapor deposited and bonded to the substrate 306 (e.g., glass). The second adhesive layer 310 can be made of such materials as acrylated resin.

Figure 4:
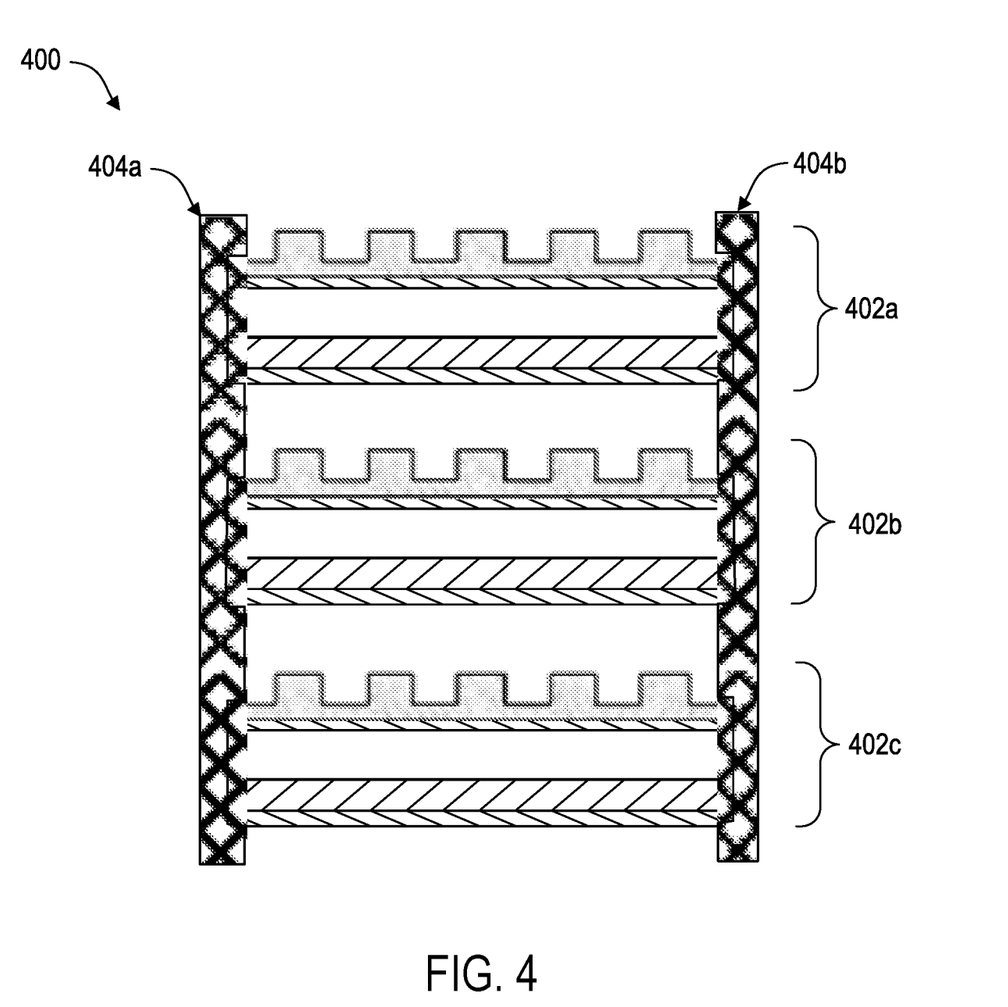
FIG. 4 illustrates a multi-waveguide optical structure.

FIG. 4 illustrates a multi-waveguide optical structure 400 including multiple waveguides 402a, 402b, 402c (collectively referred to as waveguides 402) stacked to intercept light passing sequentially through each waveguide 402. Each of the waveguides 402 can be similar to the waveguide 302 of FIG. 3. In some examples, each of the waveguides 402 is associated with a differing color and a differing depth of plane. That is, as light passes through each of the waveguides 402, each of the waveguides 402 interacts with the light differently, and each exiting light of the waveguide 402 is based on a differing color and a differing depth of plane associated with the virtual content display. In some examples, the multi-waveguide optical structure 400 includes greater than three waveguides 402, including six or nine waveguides 402. In some examples, each of the waveguides 402 of the multi-waveguide optical structure 400 is separated by air.

The multi-waveguide optical structure 400 includes waveguide supports 404a, 404b (collectively referred to as waveguide supports 404). The waveguide supports 404 connect and position the multiple waveguides 402 within the multi-waveguide optical structure 400. To that end, the first adhesive layer 304 and the second adhesive layer 310 of each of the waveguides 402 provide adhesion between the respective waveguide 402 and the waveguide supports 404. The waveguide supports 404 can be made of such materials as acrylated resin or epoxy resin. In some examples, the patterned layer 302 provides additional bonding between the respective waveguide 402 and the waveguide supports 404.

Figure 5:
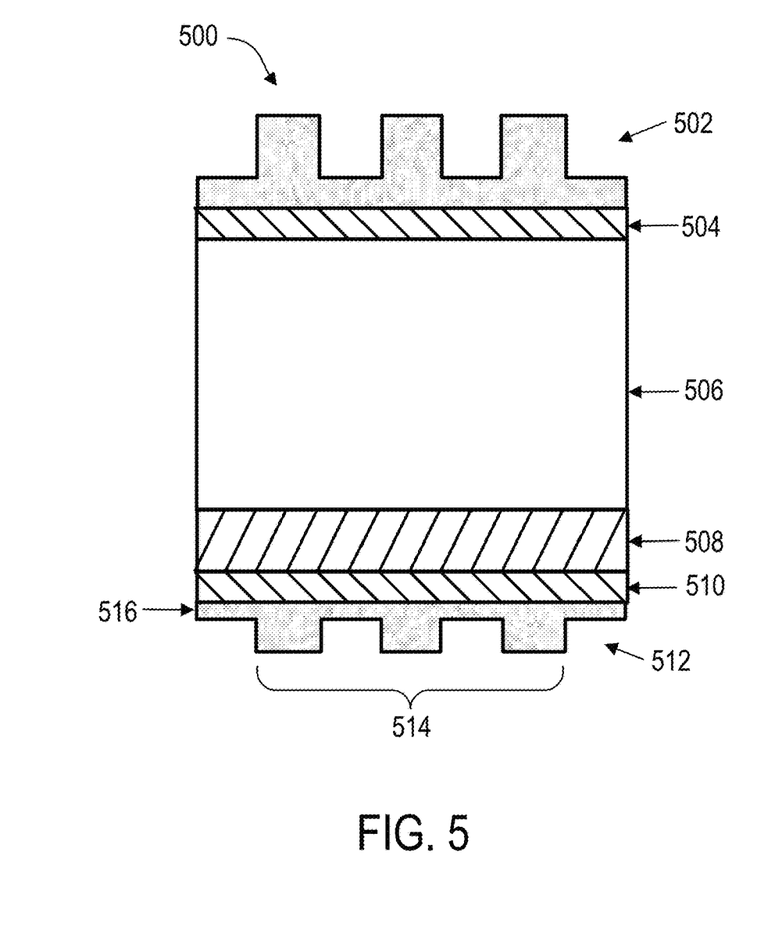

FIG. 5 illustrates a waveguide 500 including an additional patterned layer. Specifically, the waveguide 500 includes a first patterned layer 502, a first adhesive layer 504, a substrate 506, an anti-reflective layer 508, a second adhesive layer 510, and a second patterned layer 512. The first patterned layer 502, the first adhesive layer 504, the substrate 506, the anti-reflective layer 508, and the second adhesive layer 510 are substantially similar as the patterned layer 302, the first adhesive layer 304, the substrate 306, the anti-reflective layer 308, and the second adhesive layer 310 of the waveguide 300 of FIG. 3.

Figure 6:
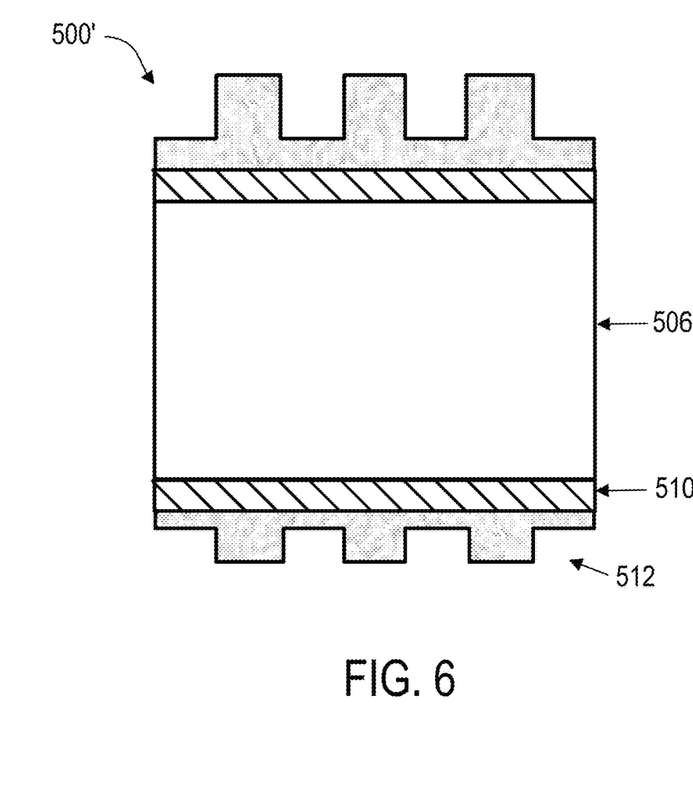

Furthermore, the second patterned layer 512 is positioned such that the second adhesive layer 510 is positioned between the anti-reflective layer 508 and the second patterned layer 512. The second adhesive layer 510 provides adhesion between the second patterned layer 512 and the substrate 506. In some examples, as shown in FIG. 6, a waveguide 500' is absent the anti-reflective layer 508, and thus, includes the second patterned layer 512 such that second adhesive layer 510 is positioned between the substrate 506 and the second patterned layer 512.

The second patterned layer 512 is substantially similar to the patterned layer 302 of FIG. 3. Specifically, the second patterned layer 512 is associated with a third index of refraction. In some examples, the first index of refraction associated with the substrate 506 is greater than the third index of refraction associated with the second patterned layer 512. In some examples, the third index of refraction is approximately 1.5. The second patterned layer 512 further includes diffraction gratings 514 and a residual layer 516 having a thickness less than 50 nanometers. The diffraction gratings 514 can be formed by such methods including imprint lithography, and can include a critical dimension of approximately 100 nanometers.

To that end, as a result of the waveguide 500 including the residual layer 516 positioned between the substrate 506 and the diffraction gratings 514, the waveguide 500 can define a diffraction-based waveguide display. In particular, the combination of the second patterned layer 512 and the substrate 506, and specifically, the combination of the second patterned layer 512 associated with the third index of refraction (e.g., approximately 1.5) and the substrate 506 associated with the first index of refraction (e.g., greater than 1.7) provides a diffraction-based waveguide display. Moreover, the diffraction-based waveguide display is provided without forming diffraction gratings in the substrate 506 as a result of forming the diffraction-based waveguide display based on the combination of the second patterned layer 512 associated with the third index of refraction (e.g., approximately 1.5) and the substrate 506 associated with the first index of refraction (e.g., greater than 1.7). Thus, the need to dry etch the substrate 506 (e.g., dry etch high-index glass or sapphire) is abrogated.

In some examples, the combination of the first patterned layer 502, the second patterned layer 512, and the substrate 506, and specifically, the combination of the first patterned layer 502 associated with the first index of refraction (e.g., approximately 1.5), the second patterned layer 512 associated with the third index of refraction (e.g., approximately 1.5), and the substrate 506 associated with the first index of refraction (e.g., greater than 1.7) provides the diffraction-based waveguide display.

The waveguide 500 is associated with a field of view based on the first and the third indices of refraction. That is, the field of view of the waveguide 500 is based on the combination of the third index of refraction associated with the second patterned layer 512 and the first index of refraction associated with the substrate 506. In some examples, the field of view of the waveguide 500 is at least 50 degrees. That is, when the third index of refraction associated with the second patterned layer 512 is approximately 1.5, and the first index of refraction associated with the substrate 506 is greater than 1.7, the field of view associated with the waveguide 500 is at least 50 degrees. In some examples, the field of view of the waveguide 500 is based on the combination of the second index of refraction associated with the first patterned layer 502, the third index of refraction associated with the second patterned layer 512 and the first index of refraction associated with the substrate 506.

In some examples, each of the waveguides 402 of the multi-waveguide optical structure 400 of FIG. 4 can be similar to the waveguide 500 of FIG. 5 and/or the waveguide 500' of FIG. 6. In some examples, the waveguides 402 of the multi-waveguide optical structure 400 can be similar to any combination of the waveguide 300 of FIG. 3, the waveguide 500 of FIG. 5, and the waveguide 500' of FIG. 6.

The imprint lithography system 100 of FIG. 1 can be used to form any of the waveguides 302, 402, 500, 500' and/or the multi-waveguide optical structure 400.

The invention claimed is:

1. A multi-waveguide optical structure, comprising:
waveguides stacked to intercept light passing sequentially through each waveguide, each waveguide comprising:
a first adhesive layer; and
a substrate having a first index of refraction; and
a patterned layer positioned such that the first adhesive layer is between the patterned layer and the substrate, wherein the first adhesive layer provides adhesion between the patterned layer and the substrate, the patterned layer has a second index of refraction, and the second index of refraction is less than the first index of refraction.

2. The multi-waveguide optical structure of claim 1, wherein each waveguide is associated with a different color.

3. The multi-waveguide optical structure of claim 1, wherein each waveguide is associated with a different depth of plane.

4. The multi-waveguide optical structure of claim 1, wherein each patterned layer defines a diffraction grating.

5. The multi-waveguide optical structure of claim 1, wherein a field of view associated with each waveguide is based on the first and the second indices of refraction.

6. The multi-waveguide optical structure of claim 5, wherein the field of view of each waveguide is at least 50 degrees.

7. The multi-waveguide optical structure of claim 1, further comprising a waveguide support connecting and positioning each waveguide of the multiple waveguides.

8. The multi-waveguide optical structure of claim 1, wherein each waveguide further comprises a second adhesive layer positioned such that the substrate is between the first adhesive layer and the second adhesive layer.

9. The multi-waveguide optical structure of claim 8, wherein each waveguide further comprises an additional patterned layer positioned such that the second adhesive layer is between the substrate and the additional patterned layer.

10. The multi-waveguide optical structure of claim 9, wherein the additional patterned layer has a third index of refraction, and the third index of refraction is less than the first index of refraction.

11. The multi-waveguide optical structure of claim 10, wherein the third index of refraction is approximately 1.5.

12. The multi-waveguide optical structure of claim 1, wherein the first index of refraction is at least 1.7.

13. The multi-waveguide optical structure of claim 1, wherein the second index of refraction is approximately 1.5.

14. The multi-waveguide optical structure of claim 1, wherein the substrate of each waveguide is free of a diffraction grating.

15. The multi-waveguide optical structure of claim 1, wherein the substrate of each waveguide is partially etched.

16. The multi-waveguide optical structure of claim 1, wherein the multi-waveguide optical structure comprises at least three waveguides.

17. The multi-waveguide optical structure of claim 1, wherein each of the waveguides is separated by air.

18. The multi-waveguide optical structure of claim 1, wherein each waveguide provides total internal refraction of the light.

19. A multi-waveguide optical structure comprising:
waveguides stacked to intercept light passing sequentially through each waveguide, each waveguide comprising:
a first adhesive layer;
an anti-reflective layer;
a substrate positioned between the first adhesive layer and the anti-reflective layer, the substrate having a first index of refraction;
a first patterned layer positioned such that the first adhesive layer is between the first patterned layer and the substrate, wherein the first adhesive layer provides adhesion between the first patterned layer and the substrate, and the first patterned layer has a second index of refraction less than the first index of refraction;
a second adhesive layer; and
a second patterned layer positioned such that the second adhesive layer is positioned between the anti-reflective layer and the second patterned layer, and the second adhesive layer provides adhesion between the second patterned layer and the anti-reflective layer.

20. A multi-waveguide optical structure comprising:
waveguides stacked to intercept light passing sequentially through each waveguide, each waveguide comprising:
a first adhesive layer;
an anti-reflective layer;
a substrate positioned between the first adhesive layer and the anti-reflective layer, the substrate having a first index of refraction;

a patterned layer positioned such that the first adhesive layer is between the patterned layer and the substrate, the first adhesive layer providing adhesion between the patterned layer and the substrate, the patterned layer having a second index of refraction less than the first index of refraction, the patterned layer defining a diffraction grating, wherein a field of view associated with the waveguide is based on the first and the second indices of refraction; and a second adhesive layer positioned such that the anti-reflective layer is positioned between the second adhesive layer and the substrate; and a waveguide support connecting and positioning each waveguide of the multiple waveguides.

* * * * *